(12) United States Patent
Takahashi et al.

(10) Patent No.: US 7,501,734 B2
(45) Date of Patent: Mar. 10, 2009

(54) MOTOR, COMPRESSOR, AND AIR CONDITIONER

(75) Inventors: Akeshi Takahashi, Hitachi (JP); Tomio Yoshikawa, Shizuoka (JP); Baiying Huang, Shizuoka (JP); Shigekazu Nozawa, Shizuoka (JP); Susumu Nakayaka, Shizuoka (JP); Haruo Koharagi, Hitachi (JP); Satoshi Kikuchi, Hitachi (JP)

(73) Assignee: Hitachi Appliances, Inc., Tokyo (JP)

( * ) Notice: Subject to any disclaimer, the term of this patent is extended or adjusted under 35 U.S.C. 154(b) by 496 days.

(21) Appl. No.: 11/356,174

(22) Filed: Feb. 17, 2006

(65) Prior Publication Data

US 2006/0181173 A1    Aug. 17, 2006

(30) Foreign Application Priority Data

Feb. 17, 2005    (JP) .............................. 2005-039945

(51) Int. Cl.
*H02K 3/04* (2006.01)

(52) U.S. Cl. ...................................................... 310/216

(58) Field of Classification Search ......... 310/216–218, 310/54, 259, 211, 212; 417/423.7, 423.8
See application file for complete search history.

(56) References Cited

U.S. PATENT DOCUMENTS 7,094,029 B2 *   8/2006   Taylor et al. ............. 415/213.1

2002/0096885 A1 * 7/2002 Gomez et al. ............. 290/38 R
2006/0026818 A1 * 2/2006 Stewart et al. ............. 29/596
2006/0181173 A1 * 8/2006 Takahashi et al. ........... 310/216
2007/0069591 A1 * 3/2007 LeFlem ...................... 310/12

FOREIGN PATENT DOCUMENTS

| CN | 1384588 | 12/2002 |
|---|---|---|
| JP | 11-125183 | 5/1999 |
| JP | A-2003-269335 | 9/2003 |

* cited by examiner

*Primary Examiner*—Gary F. Paumen
(74) *Attorney, Agent, or Firm*—Antonelli, Terry, Stout & Kraus, LLP.

(57) ABSTRACT

The invention provides a motor comprising a stator and a rotor. The stator core includes a laminated stator core made of laminated stator core plates in which straight cut surfaces are formed on a circular outer peripheral surface of the laminated stator core plates. The straight cut surfaces of the laminated stator core plates are circumferentially displaced every predetermined laminated stator core plates so that the straight cut surfaces are uniformly distributed in an axial and a circumferential direction of the laminated stator core. Therefore, a flow passage for lubricating oil is ensured, while local magnetic saturation of the stator core is dissolved and a cogging torque and an induced voltage waveform distortion rate are improved.

12 Claims, 10 Drawing Sheets

MOTOR, COMPRESSOR, AND AIR CONDITIONER

BACKGROUND OF THE INVENTION

The present invention relates to a motor and a compressor.

Scroll type or rotary type compression elements are adopted in compressors and the compression elements need lubricating oil since they are mechanical mechanisms. Therefore, an oil reservoir is provided on a bottom of a compressor, lubricating oil in the oil reservoir is led to the compression elements, and then the lubricating oil is returned to the oil reservoir through straight cut surfaces (referred below to as D-cuts since each of four surface cuts looks D-shape) provided on an outer periphery of a laminated stator core of a motor for driving the compression mechanism. The straight cut surfaces provided on the outer periphery of the stator laminated stator core are indispensable as flow passages for the lubricating oil flowing through a compression mechanism part, and the larger an area of the D-cuts, the easier the lubricating oil flows back, thus contributing an increase in material utilization rate. JP-A-2003-269335 discloses a construction, in which cuts are provided on an outer periphery of a stator core of a motor and a refrigerant flows through the core cuts between a casing and the stator core.

As a result of various experiments and examinations, a motor provided with D-cuts involves a problem of large vibration and noise.

It is an object of the invention to provide a motor that can ensure a flow passage for lubricating oil as in the conventional art and involves small vibration and noise, and a compressor that uses the motor.

SUMMARY OF THE INVENTION

The invention provides a motor comprising a stator comprising a laminated stator core made of laminated stator core plates in which a plurality of slots are formed and armature windings are provided in the slots and straight cut surfaces are formed on a circular outer peripheral surface of a laminated stator core, and a rotor rotatably supported in an inner peripheral side of the laminated stator core with a predetermined air gap therebetween, and wherein the straight cut surfaces of the laminated stator core plates are circumferentially displaced every predetermined laminated stator core plates so that the straight cut surfaces are uniformly distributed in an axial and a circumferential direction of the laminated stator core. Therefore, while a flow passage for lubricating oil is ensured as in the conventional art, local magnetic saturation of the stator core is dissolved and a cogging torque and an induced voltage waveform distortion rate are improved.

Other objects, features and advantages of the invention will become apparent from the following description of the embodiments of the invention taken in conjunction with the accompanying drawings.

DESCRIPTION OF THE PREFERRED EMBODIMENTS

An embodiment relates to a motor used in air conditioners, chillers, showcases, etc. and a compressor that uses the motor.

Figure 1:
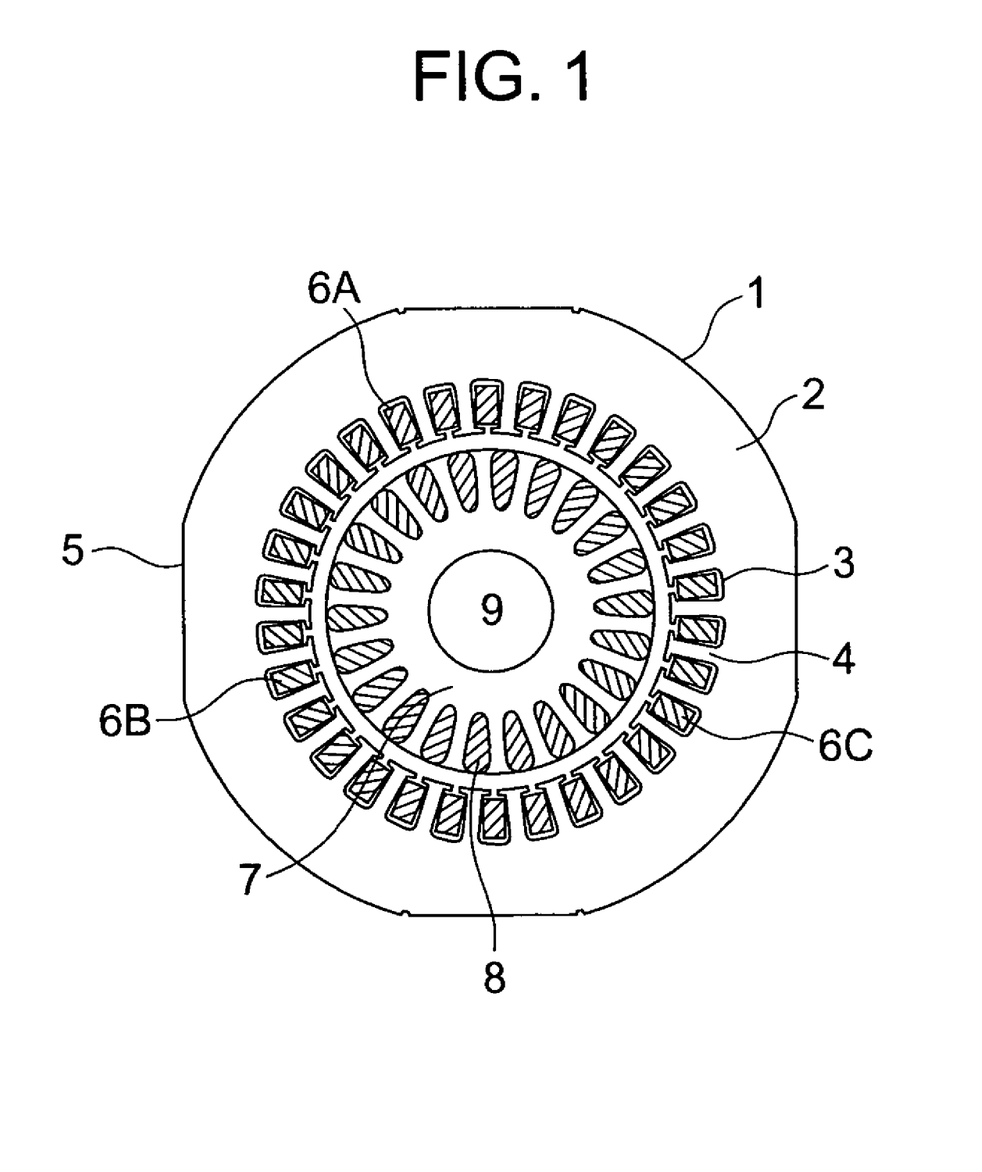
FIG. 1 is a radial sectional view of an induction motor.

FIG. 1 is an axial sectional view of a motor. In FIG. 1, a stator 1 comprises a stator core 2, a plurality of slots 3 (30 slots in the drawing) provided on the stator core, and teeth 4 divided by the slots 3. The stator 1 is provided on an outer periphery thereof with a plurality of D-cuts 5 (4 cuts in the drawing). An armature winding 6 (comprising a U-phase winding 6A, a V-phase winding 6B, a W-phase winding 6C) comprises distributed windings in which the same phase is distributed on the plurality of slots 3. A rotor comprises a squirrel cage winding including conductive bars 8 in a plurality of slots provided around an outer peripheral portion of a rotor core 7 and a conductive end ring (not shown) that short-circuits the bars at an axial end surface, and a shaft 9.

Figure 2A:
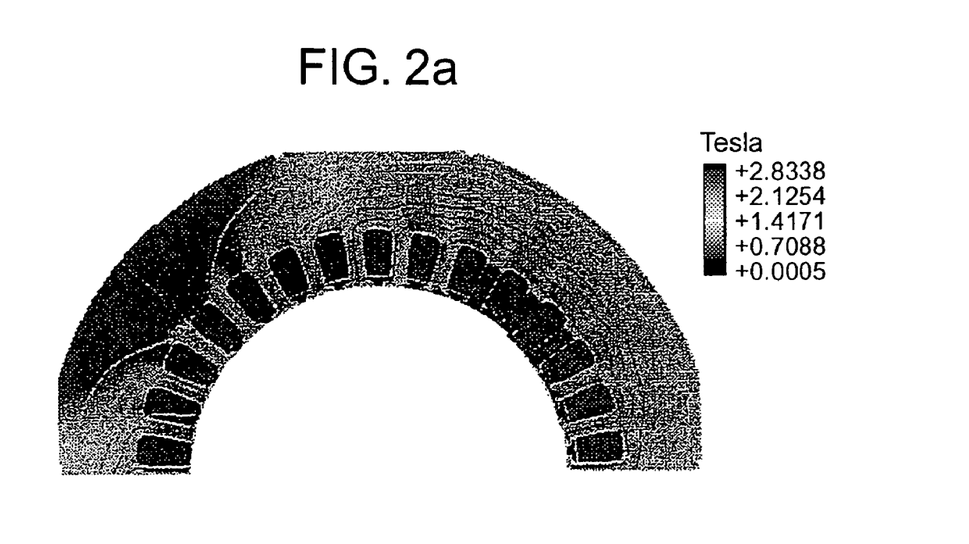
FIGS. 2a and 2b are views illustrating results of Finite Element Method analysis for a stator of the induction motor.
Figure 2B:
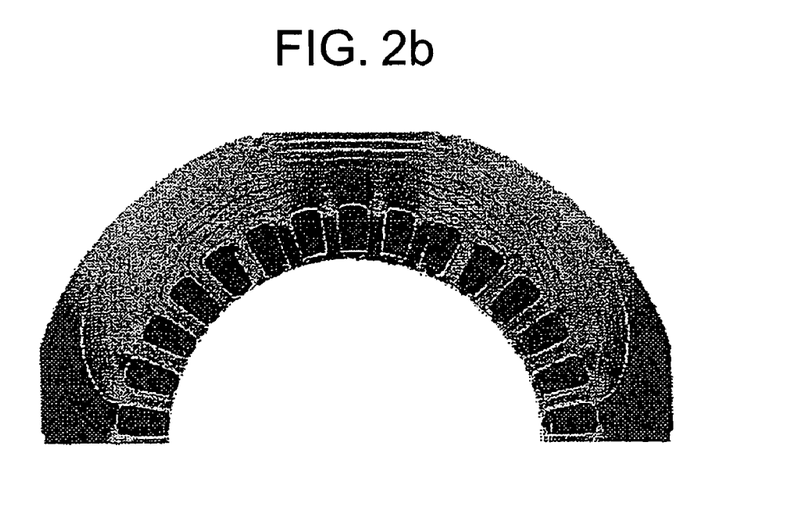

FIGS. 2a and 2b show Finite Element Method analysis results of the stator shown in FIG. 1. FIG. 2a shows a condition, in which flux concentrates on a cylindrical-shaped portion of the stator core, and any conspicuous magnetic saturation is not found. On the other hand, as shown in FIG. 2b, when flux concentrates on the D cut portions, a local magnetic saturation becomes conspicuous, and thus there is caused a problem that since such magnetic saturation is repeated cyclically as the rotor rotates, vibration and noise become large.

Figure 3A:
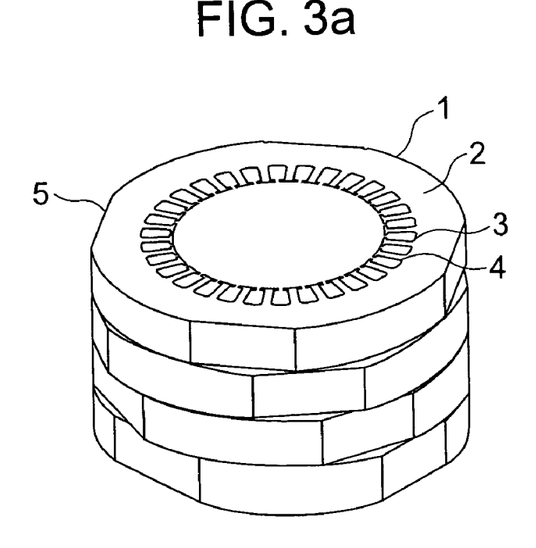
FIG. 3a is a perspective view showing circumferential displacement of a laminated stator core of an induction motor according to a first embodiment of the invention.
Figure 3B:
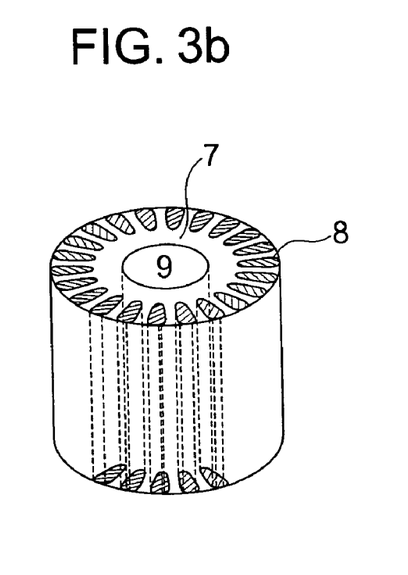
FIG. 3b is a perspective view showing a rotor of the induction motor according to the first embodiment of the invention.

In order to solve such problem, a motor according to a first embodiment of the invention is constructed as shown in FIGS. 3a and 3b to realize reduction in vibration and noise. FIG. 3a is a perspective view showing circumferential displacement of a laminated stator core of an induction motor according to a first embodiment of the invention. FIG. 3b is a perspective view showing a rotor of the induction motor according to the first embodiment of the invention. In FIG. 3a, the D-cuts 5 are displaced in a circumferential direction every predetermined laminated stator core plates with a pitch twice a slot pitch. The laminated stator core plates are fixed to each other by means of welding. As shown in FIGS. 3a and 3b, by circumferentially displacing the D-cuts of the laminated stator core plates so that the D-cuts are uniformly distributed in the axial and the circumferential direction, a local magnetic saturation of the stator core plates is dissolved and a flow passage for a lubricating oil can be ensured as in the conventional art and a cogging torque and an induced voltage waveform distortion rate are improved. Also, while the D-cuts in the present embodiment are formed by straight cut lines, it suffices that even if not straight cut lines, the cut lines are dented from a circle so as to enable ensuring a flow passage for lubricating oil. Further, while the winding in the present embodiment comprises a distributed winding, an effect of the embodiment is also obtained with a concentrated winding.

When a pitch of the slots 3 is 12° and the D-cuts 5 are circumferentially displaced at n (n=1, 2, ... ) times the slot pitch, there are the following four cases (a) to (d);

case (a): a circumferential pitch of the D-cuts equal to the slot pitch, that is, 12° pitch-8 tiers stator core;

case (b): a circumferential pitch of the D-cuts twice the slot pitch, that is, 24° pitch-4 tiers stator core;

case (c): a circumferential pitch of the D-cuts three times the slot pitch, that is, 36° pitch-3 tiers stator core; and case (d): a circumferential pitch of the D-cuts four times the slot pitch, that is, 48° pitch-2 tiers stator core.

Figure 4:
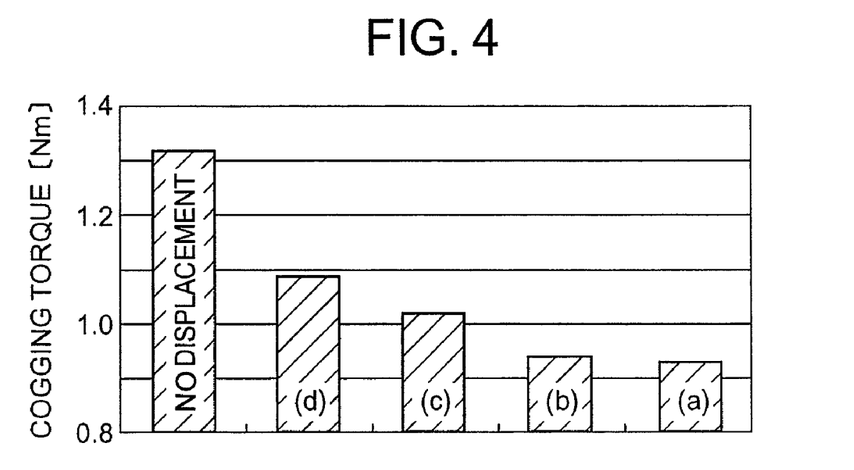
FIG. 4 is a graph illustrating a comparison in a cogging torque between the induction motor according to the first embodiment of the invention and the prior art induction motor.
Figure 5:
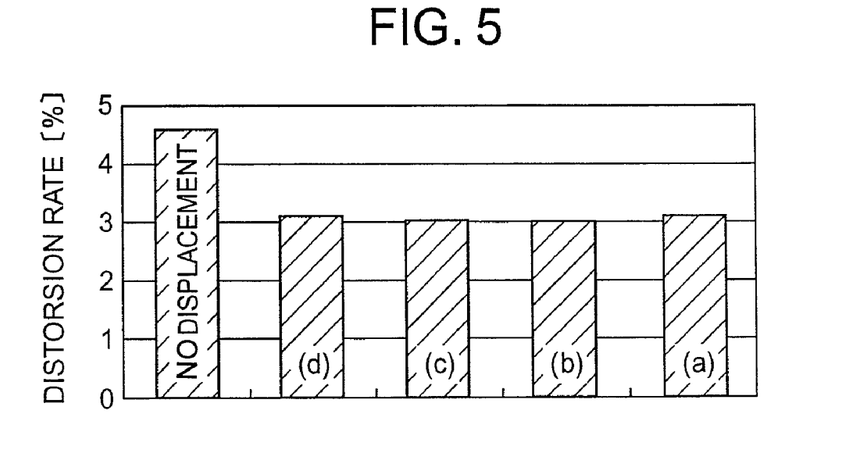
FIG. 5 is a graph illustrating a comparison in distortion rate of an induced voltage between the induction motor according to the first embodiment of the invention and the prior art induction motor.

FIGS. 4 and 5 show results of survey of characteristic improvement effects in the respective cases (a) to (d). FIG. 4 shows a comparison of a cogging torque in terms of a peak-to-peak value and FIG. 5 shows a comparison of an induced voltage waveform distortion rate. Sharp reduction of the cogging torque can be achieved at the time of n=1 and n=2 and the induced voltage waveform distortion rate is reduced in all the cases of n=1 to 4. Accordingly, taking simplification of a manufacturing process into consideration, it is preferable that the circumferential displacement be made so as to realize n=2.

According to the present embodiment, the laminated stator core is made uniform in the core back area in the axial and circumferential directions, so that a local magnetic saturation of the stator core is dissolved and a flow passage for a lubricating oil can be ensured as in the conventional art and a cogging torque and an induced voltage waveform distortion rate are improved. As a result, it is possible to reduce vibration and noise.

Figure 6:
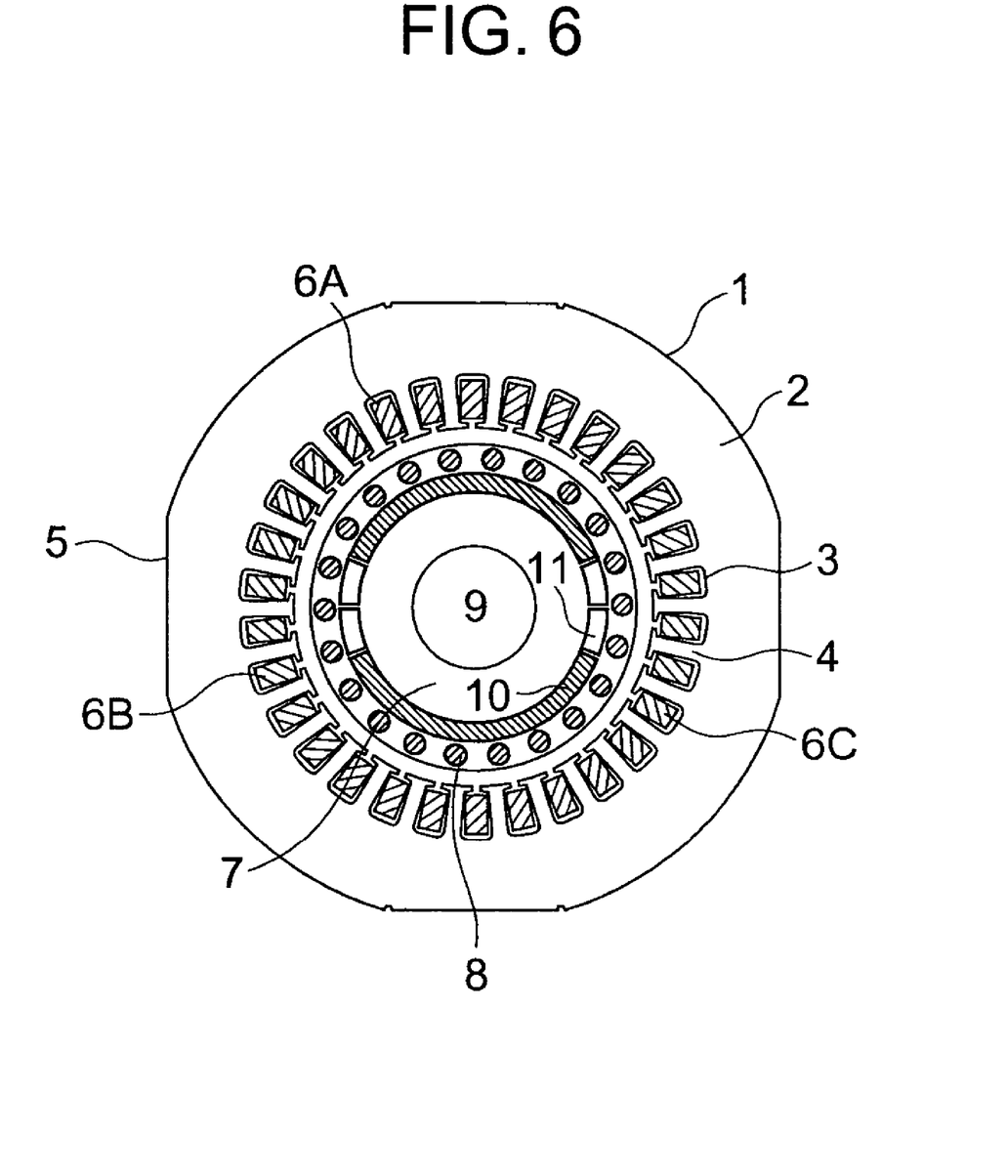
FIG. 6 is a radial sectional view showing a self-start type induction motor according to a second embodiment of the invention.
Figure 7A:
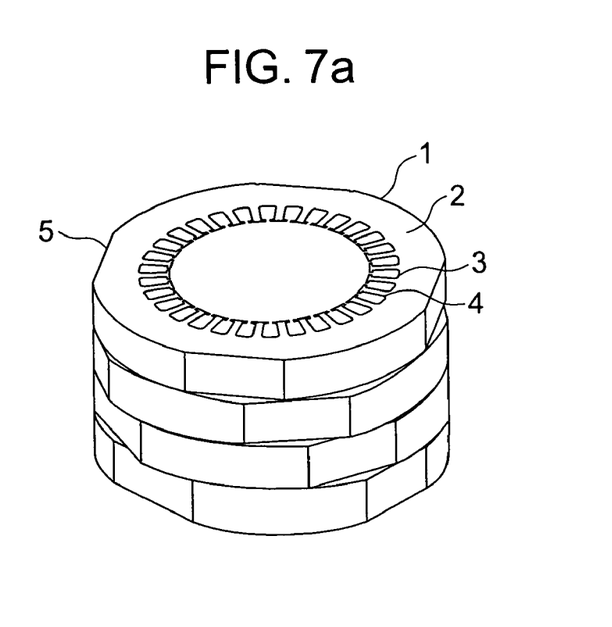
FIG. 7a is a perspective view showing circumferential displacement of a laminated stator core of the self-start type induction motor according to the second embodiment of the invention.
Figure 7B:
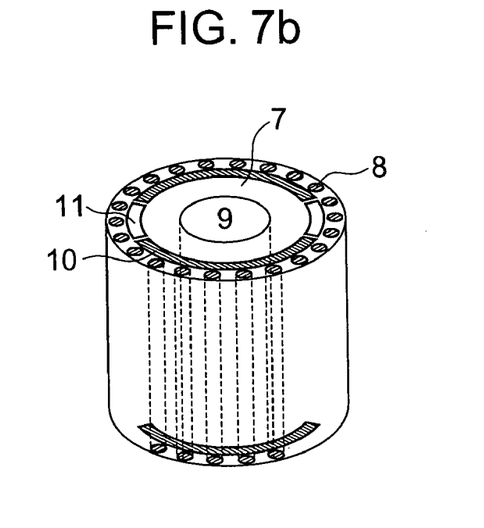
FIG. 7b is a perspective view showing a rotor of the self-start type induction motor according to the second embodiment of the invention.

FIG. 6 is a radial sectional view of a motor according to a second embodiment of the invention. The second embodiment is different from the first embodiment in that permanent magnets 10 and vacancies 11 are arranged radially inwardly of conductive bars 8 provided on a rotor core 7. FIG. 7a is a perspective view showing circumferential displacement of a laminated stator core of the self-start type induction motor according to the second embodiment of the invention. FIG. 7b is a perspective view showing a rotor of the self-start type induction motor according to the second embodiment of the invention.

Figure 8:
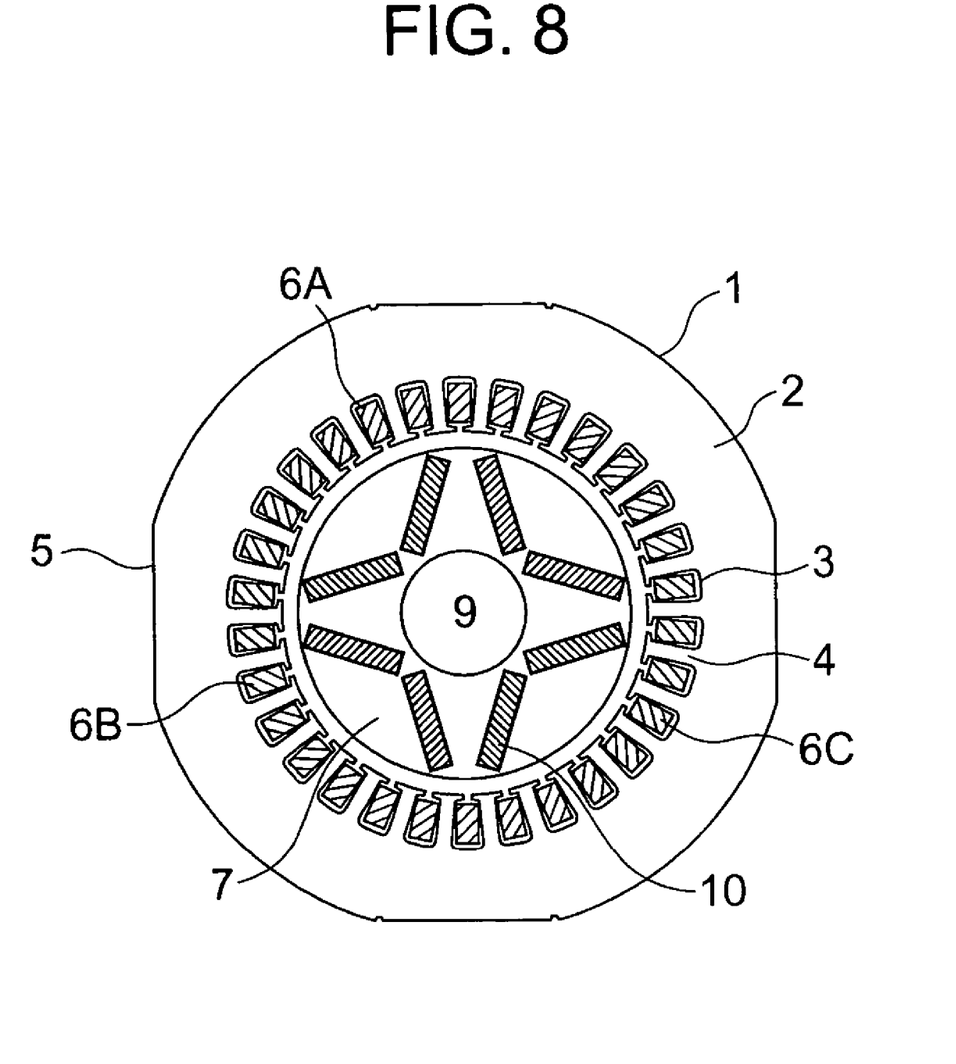
FIG. 8 is a radial sectional view showing a synchronous motor according to a third embodiment of the invention.
Figure 9A:
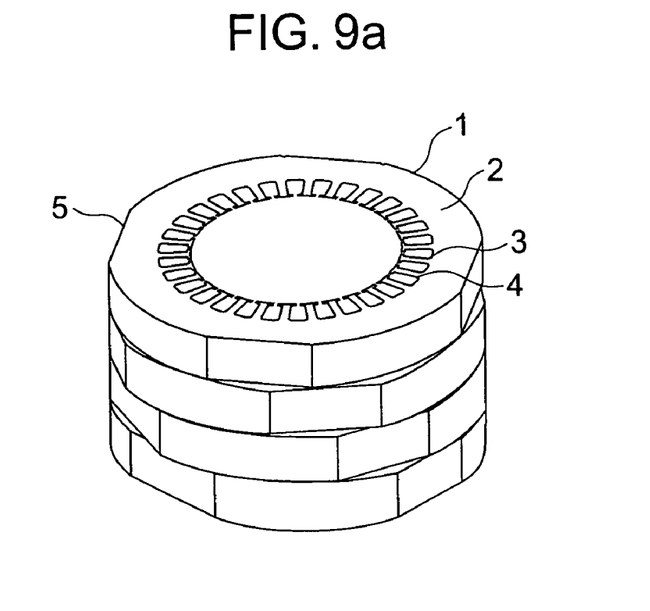
FIG. 9a is a perspective view showing circumferential displacement of a laminated stator core of the synchronous motor according to the third embodiment of the invention.
Figure 9B:
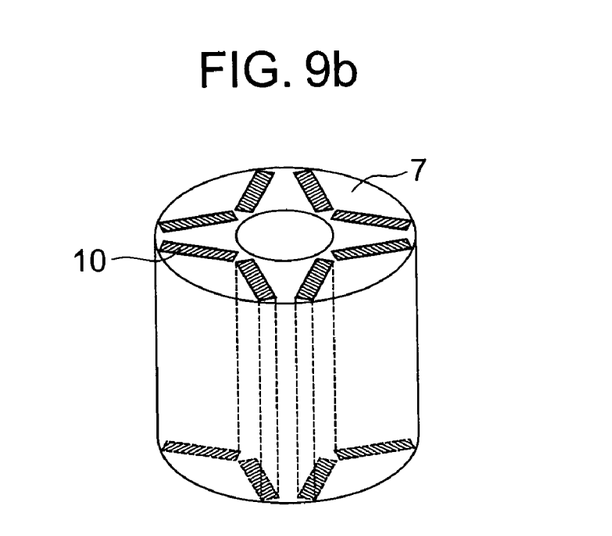
FIG. 9b is a perspective view showing a rotor of the synchronous motor according to the third embodiment of the invention.

FIG. 8 is a radial sectional view of a motor according to a third embodiment of the invention. The third embodiment is different from the first embodiment and the second embodiment in that any conductive bars are not provided on a rotor core 7 but permanent magnets 10 are provided thereon. FIG. 9a is a perspective view showing circumferential displacement of a laminated stator core of the synchronous motor according to the third embodiment of the invention. FIG. 9b is a perspective view showing a rotor of the synchronous motor according to the third embodiment of the invention.

Figure 10:
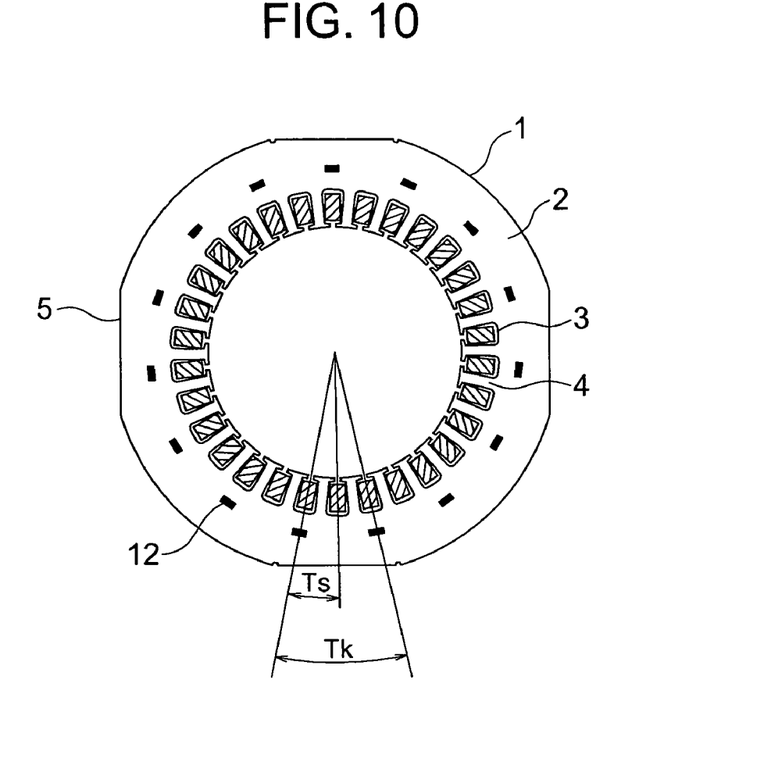
FIG. 10 is a radial sectional view showing a laminated stator core of a motor according to a fourth embodiment of the invention.

FIG. 10 is a radial sectional view of a stator of a motor according to a fourth embodiment of the invention. The fourth embodiment is different from the first, second and third embodiments in that caulking holes 12 are provided on a stator core 2. Here, the number Nk of the caulking holes 12 is related to the number Ns of slots by Nk=Ns/n (n=1, 2, ... ), and a circumferential pitch Tk is related to a slot pitch Ts by Tk=n·Ts. In FIG. 10, n=2.

Figure 11:
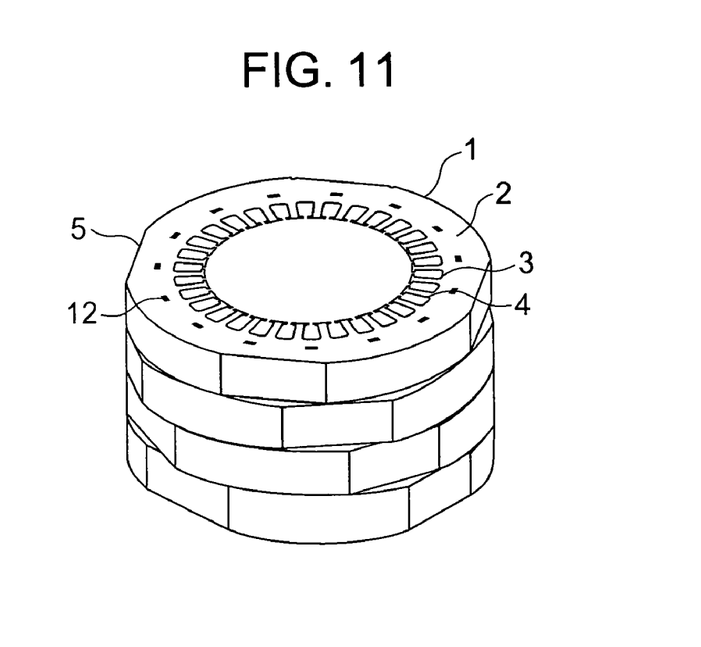
FIG. 11 is a perspective view showing circumferential displacement of the laminated stator core of the motor according to the fourth embodiment of the invention.

FIG. 11 is a perspective view showing circumferential displacement of the laminated stator core of the motor according to the fourth embodiment of the invention. In the fourth embodiment, the D-cuts 5 are circumferentially displaced with a pitch twice the slot pitch. The laminated stator core plates are fixed to each other by the caulking holes 12.

Figure 12:
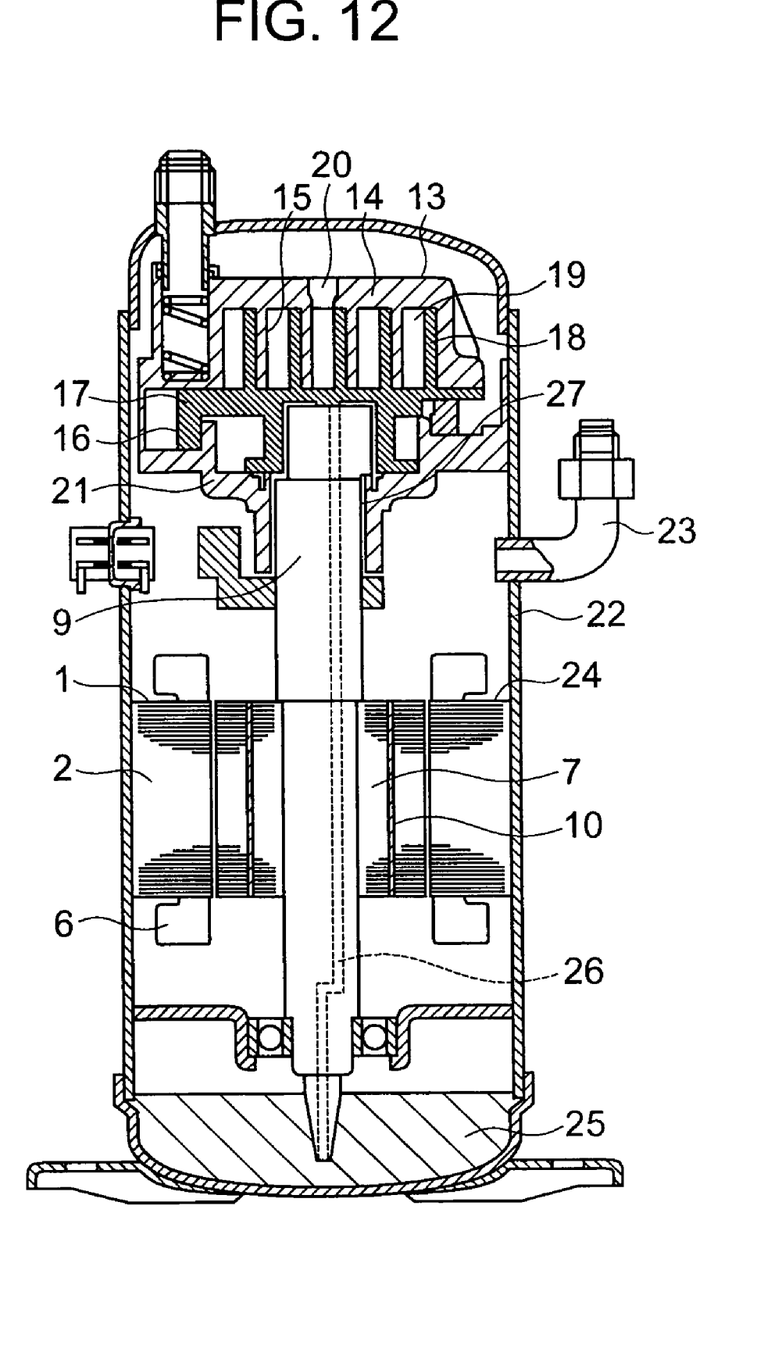
FIG. 12 is a sectional view showing a construction of a compressor, to which the invention is directed.

FIG. 12 is a view showing a sectional construction of a compressor, to which the invention is directed. In FIG. 12, a compression mechanism part is formed by meshing a spiral wrap 15 provided upright on an end plate 14 of a fixed scroll member 13 with a spiral wrap 18 provided upright on an end plate 17 of an orbiting scroll member 16, and compression motions are made by orbital movement of the orbiting scroll member 16 caused by a crankshaft 27.

A compression chamber 19, which is positioned on an outermost side among compression chambers defined by the fixed scroll member 13 and the orbiting scroll member 16 moves toward centers of the both scroll members 13, 16 with the orbital movement and its volume is gradually decreased.

When the compression chamber 19 reaches near the centers of the both scroll members 13, 16, a compressed gas in the compression chamber 19 is discharged from a discharge port 20 communicated to the compression chamber 19. The compressed gas as discharged passes through a gas passage (not shown) provided on the fixed scroll member 13 and a frame 21 to reach an interior of a pressure vessel 22 in a lower region of the frame 21 to be discharged outside the compressor through a discharge pipe 23 provided on a side wall of the pressure vessel 22.

Also, with the compressor, a synchronous motor 24 is sealedly received in the pressure vessel 22 to rotate at a constant speed to perform a compressing operation.

An oil reservoir 25 is provided below the synchronous motor 24. A pressure difference produced by rotational movements causes an oil in the oil reservoir 25 to pass through an oil hole 26 provided in the crankshaft 27 to be fed for lubrication of sliding portions of the orbiting scroll member 16 and the crankshaft 27, a ball bearing, etc.

The synchronous motor 24 comprises a synchronous motor composed of the stator 1 and the rotor 7 as illustrated in FIGS. 1 to 10.

When the motor in the invention is applied to a drive motor for the compressor, it is possible to realize making a constant-speed compressor high in efficiency. Also, an air conditioner making use of the compressor can realize an air conditioner of high efficiency and low noise.

While the embodiment has been described with respect to an example, in which the laminated stator core plates are displaced in the circumferential direction stepwise in two tiers, three tiers, four tiers, and eight tiers, a construction, in which the laminated stator core plates each are continuously displaced in the circumferential direction, is also conceivable. That construction, in which the laminated stator core plates each are circumferentially displaced continuously, is highest in effects of reduction in cogging torque. On the other hand, that construction, in which the laminated stator core plates are circumferentially displaced stepwise and the number of tiers is as small as possible, produces an advantage that manufacture in less processes is possible.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor comprising a stator including laminated stator core plates having cut surfaces on outer peripheral surfaces thereof, a plurality of slots formed in the stator core, and an armature winding provided in the slots, and a rotor supported rotatably on an inner peripheral side of the stator core with a predetermined air gap therebetween, and wherein the cut surfaces of the laminated stator core plates are circumferentially displaced in an axial direction of the stator core.

2. A motor according to claim 1, wherein the cut surfaces of the laminated stator core plates are circumferentially displaced with a pitch n times (n=1,2, . . . ) a pitch of the slots in the axial direction of the laminated stator core plates.

3. A motor according to claim 1, wherein the laminated stator core plates are provided with a plurality of caulking holes for lamination and fixation of the core plates, setting is made so that the number Nk of the caulking holes is related to the number Ns of the slots by Nk=Ns/n (n=1, 2, . . . ) and a circumferential pitch Tk of the caulking holes is related to a pitch Ts of the slots by Tk=n·Ts, and the cut surfaces of the laminated stator core plates are circumferentially displaced with the circumferential pitch Tk in the axial direction of the stator core plates.

4. A motor according to claim 1, wherein the rotor comprises a squirrel cage winding including a rotor core, conductive bars in a plurality of slots provided in the vicinity of an outer periphery of the rotor core, and a conductive end ring that short-circuits the conductive bars at an axial end surface thereof.

5. The motor according to claim 1, wherein the rotor comprises a rotor core and a permanent magnet arranged in a magnet insertion hole arranged inside the rotor core.

6. A motor comprising a stator including laminated stator core plates having cut surfaces on an outer peripheral surfaces, the cut surfaces being circumferentially displaced in an axial direction of the stator core plates, a rotor arranged on an inner peripheral side of the stator core, the stator core having a plurality of slots and an armature winding wound in the slots.

7. A motor according to claim 6, wherein the cut surfaces of the laminated stator core plates are circumferentially displaced with a pitch n times (n=1, 2, . . . ) a pitch of the slots in the axial direction of the laminated stator core plates.

8. A motor according to claim 6, wherein the laminated stator core plates are provided with a plurality of caulking holes for lamination and fixation of the core plates, setting is made so that the number Nk of the caulking holes is related to the number Ns of the slots by Nk=Ns/n (n=1, 2, . . . ) and a circumferential pitch Tk of the caulking holes is related to a pitch Ts of the slots by Tk=n·Ts, and the cut surfaces of the laminated stator core plates are circumferentially displaced with the circumferential pitch Tk in the axial direction of the stator core plates.

9. A motor according to claim 6, wherein the rotor comprises a squirrel cage winding including a rotor core, conductive bars in a plurality of slots provided in the vicinity of an outer periphery of the rotor core, and a conductive end ring that short-circuits the conductive bars at an axial end surface thereof.

10. The motor according to claim 6, wherein the rotor comprises a rotor core and a permanent magnet arranged in a magnet insertion hole arranged inside the rotor core.

11. A compressor comprising a motor comprising a stator including laminated stator core plates having cut surfaces on outer peripheral surfaces thereof, a plurality of slots formed in the stator core, and an armature winding provided in the slots, and a rotor supported rotatably on an inner peripheral side of the stator core with a predetermined air gap therebetween, and wherein the cut surfaces of the laminated stator core plates are circumferentially displaced in an axial direction of the stator core, and wherein the rotor of the motor is driven to perform compression motions.

12. An air conditioner including a compressor comprising a motor comprising a stator including laminated stator core plates having cut surfaces on outer peripheral surfaces thereof, a plurality of slots formed in the stator core, and an armature winding provided in the slots, and a rotor supported rotatably on an inner peripheral side of the stator core with a predetermined air gap therebetween, and wherein the cut surfaces of the laminated stator core plates are circumferentially displaced in an axial direction of the stator core, and wherein the rotor of the motor is driven to perform compression motions.

* * * * *

UNITED STATES PATENT AND TRADEMARK OFFICE
CERTIFICATE OF CORRECTION

PATENT NO.        : 7,501,734 B2                                              Page 1 of 1
APPLICATION NO.   : 11/356174
DATED             : March 10, 2009
INVENTOR(S)       : Takahashi et al.

It is certified that error appears in the above-identified patent and that said Letters Patent is hereby corrected as shown below:

On the title page, item [75] should read:
(75) Inventors:  Akeshi Takahashi, Hitachi (JP)
                 Tomio Yoshikawa, Shizuoka (JP)
                 Baiying Huang, Shizuoka (JP)
                 Shigekazu Nozawa, Shizuoka (JP)
                 Susumu Nakayama, Shizuoka (JP)
                 Haruo Koharagi, Hitachi (JP)
                 Satoshi Kikuchi, Hitachi (JP)

Signed and Sealed this

First Day of September, 2009

David J. Kappos
*Director of the United States Patent and Trademark Office*